United States Patent [19]
Beneteau

[11] 3,783,226
[45] Jan. 1, 1974

[54] MULTIPLE WELDING ELECTRODE

[76] Inventor: Donald J. Beneteau, 1293 Front St., Amherstburg, Ontario, Canada

[22] Filed: Dec. 15, 1972

[21] Appl. No.: 315,685

[52] U.S. Cl. ........... 219/120, 339/270 R, 339/273 F
[51] Int. Cl. ....... B23k 9/24, B23k 11/30, H01r 7/06
[58] Field of Search ..................... 219/119, 120, 87, 219/161; 339/117 P, 273

[56] References Cited
UNITED STATES PATENTS

| | | | |
|---|---|---|---|
| 3,521,026 | 7/1970 | Beneteau | 219/119 |
| 2,988,727 | 6/1961 | Berndt | 339/273 S |
| 3,096,393 | 7/1963 | Mancini | 339/273 F X |
| 1,649,923 | 11/1927 | Post | 339/270 R |

*Primary Examiner*—J. V. Truhe
*Assistant Examiner*—Hugh D. Jaeger
*Attorney*—Charles Krassov

[57] ABSTRACT

In resistance multiple spot welding where several electrodes are slidably contained in a single electrically conductive block, an electrode which is divided into three sections, i.e., an upper plug, a middle expending socket, and a lower electrode section. These sections are not connected but slide upon each other on conical surfaces in order to provide expansion to the central socket, in order to cause jamming between the electrode and the block thereby insuring good contact for the passage of an electric current.

2 Claims, 5 Drawing Figures

PATENTED JAN 1 1974 3,783,226
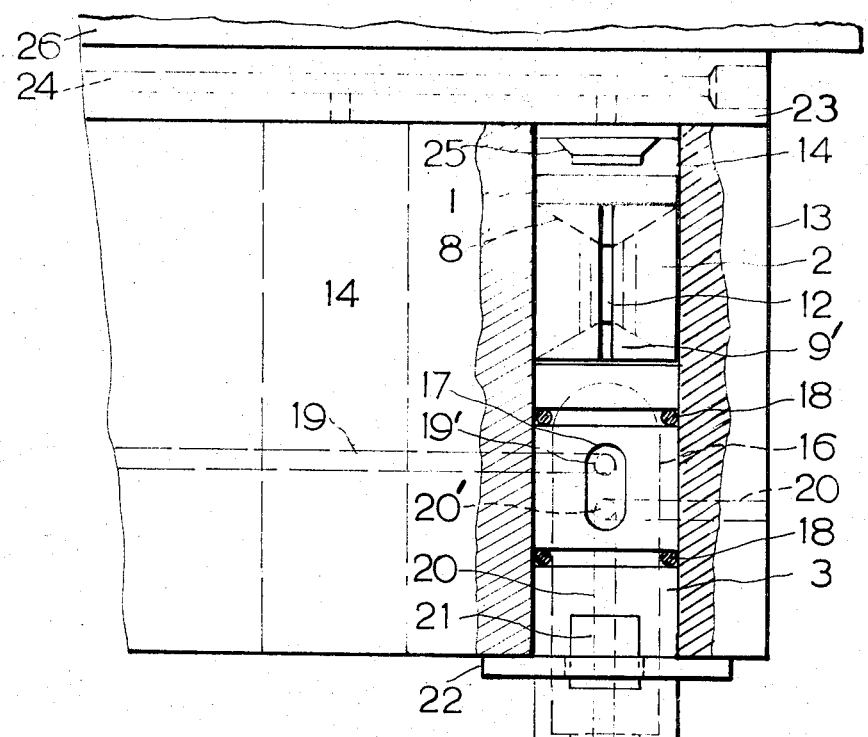
FIG. 1
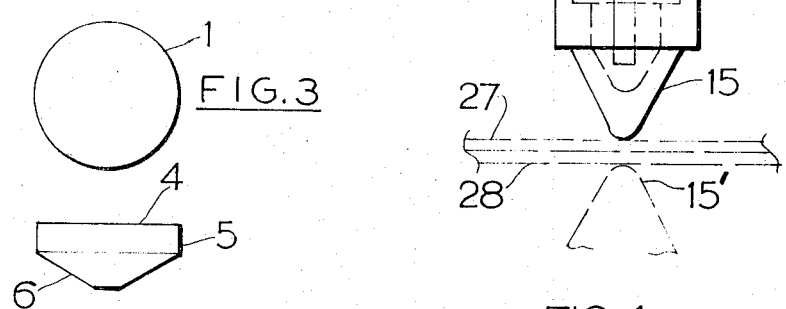
FIG. 3
FIG. 2
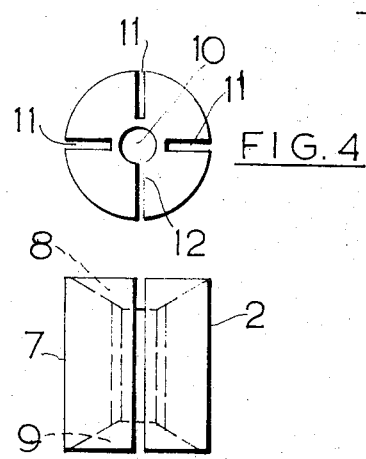
FIG. 4
FIG. 5

MULTIPLE WELDING ELECTRODE

This invention relates generally to resistance welding electrodes, and particularly to electrodes used in multiple spot welding operations.

The process of spot welding two metals together consists of pressing two electrodes together with the metal between them and passing an electric current through the said electrodes; this causes fusion of the metals at the point of contact.

Where a single spot weld is required the operation is comparatively simple, however, where a number of spot welds are required it has been found that welding the entire number of spots simultaneously is the most economical way of doing it. This process, which will be referred to as multiple spot welding, involves several difficulties which this invention is able to overcome.

In multiple spot welding operations two very important controls must be maintained in order to obtain satisfactory results. In the first place the pressure applied to the electrodes must be uniformly and equally distributed between all the welding spots. Failure to maintain uniform pressure distribution results in some of the welds having poor or no fusion at all, and the item to be welded is defective. The variation in pressure upon the electrodes is caused mostly by the irregularity of the metal thickness and by the contour of the items to be welded. Very minute differences in metal thickness can cause harmful variations in pressure. In order to overcome this condition, electrodes, which are contained in a common electrically conductive block, are allowed a small amount of up and down movement so that when pressure is applied each of the electrodes is able to seek and adjust itself to the required level.

This freedom of movement of the electrodes within the said block creates the second problem, i.e. maintaining of uniform and equal electrical distribution between the electrodes, the failure of which also results in defective welding spots as described above. The poor electrical distribution is caused by the minute space which allows the movement of the electrode within the block, so that when one spot is fused, the electrical current has a tendency to bypass the remaining electrodes.

Therefore one object of this invention is to provide an electrode for multiple spot welding which has a limited up and down movement within its conductive block in order to maintain uniform pressure distribution among all of the electrodes, and Another object of the invention is to provide positive contact between the conductive block and all of its contained electrodes in order to insure continuous and uniform flow of electricity to each of the said electrodes.

This is accomplished in the invention by providing an electrode which is divided into three sections; each said section being free to slide upon a conical surface common to all sections, so that when pressure is applied to the split electrode jamming takes place between the electrode and the block, thus providing an uninterrupted flow of current to the electrode.

In describing the invention reference will be made to the attached drawings in which,-

FIG. 1 is an elevation of the invention,

FIG. 2 is an elevation of part of the invention referred to as the plug,

FIG. 3 is a plan of the part shown in FIG. 2,

FIG. 4 is a plan view of part of the invention referred to as the socket, and

FIG. 5 is an elevation of the part shown in FIG. 4.

In the drawings is shown a cylindrical electrode consisting of three main parts, i.e. an upper plug 1, a middle socket 2, and the main body of the electrode 3.

The plug 1 has a flat top 4, a short wall 5 at rightangles to the top 4, and a conical bottom 6 extending downwardly from the wall 5.

The middle socket 2 consists of a cylinderical bar 7 having a conical cavity 8 in its upper end, and an identical cavity 9 in its lower end. The two cavities whose perimeters start at parimeter of the bar 7 are joined by a circular centrally located hole 10. Equally spaced around the wall of the bar 7 is a plurality of vertical grooves 11. These grooves terminate a short distance from the wall of the hole 10, except one of said grooves, marked 12, which is cut right into the said wall.

The part 3 of the electrode constitutes the main body thereof, and all the three components of the electrode are held within the electrically conductive block 13 which is provided with a number of tubular holes 14 in which the said electrode parts are slidably contained.

The lower part of the main body 3 extends beyond the block 13 and this extension is fitted with an electrode tip 15. The upper end of this electrode part terminates in a cone 9' which fits into the lower conical cavity 9 of the socket 2, the upper conical cavity 8 of which is filled by the conical part 6 of the plug 1.

The main body 3 of the electrode is also provided with a hollow water cooling chamber 16. A pair of oppositely located oval shaped grooves 17 which are enclosed by a pair of rubber "O" rings 18,18, confine the entry and discharge of cooling water to the immediate location of the grooves 17,17. The object of the grooves 17,17, is to make contact with the water feed passage 19 and the water discharge passage 20 of the block 13, at any position of the electrode during its up or down movement.

Two oppositely located rectangular undercut sections 21,21, in the wall of the electrode part 3 are fitted with an outside washer 22 which limits the travel of the electrode to the distance between the upper and lower edges of the sections 21.

Above the block 13 is a manifold 23 containing a passage 24 which is connected to each of the tubular holes 14. This passage is filled with grease packing which is fed to a rubber cap 25 in each of the holes 14 to the top of the electrodes. The block 13 and its manifold 23 are fixed to the platen 26 of a welding press.

In FIG. 1 are shown two metal plates 27 and 28 which are to be spot welded together at the spot where the positive electrode tip 15 meets the negative tip 15'. When pressure is applied to the block 13, each electrode slides within the block and allows its tip 15 to find its own proper level, and at the same time the grease pack on top of each electrode has a cushioning effect upon it; thus uniform distribution of pressure is provided between all of the electrodes in the block.

The cooling of the electrodes and the block in which they are contained is accomplished by the circulation of cold water inside each electrode. The cooling water enters the block 13 through the passage 19 and makes contact with the hole 19' in the groove 17; this fills the chamber 16; the water then discharges through the passage 20 which makes contact with the hole 20' in the opposite groove 17.

The required sliding fit between the electrodes and the tubular holes 14 in which they are contained does not provide the best of contacts between the electrodes and the block 13 for the passage of electricity. This is corrected by the provision of the plug 1 and socket 2 of the electrode, in the following manner. When pressure is applied to the electrode the inclined conical surface 6 of the plug presses down upon the corresponding conical cavity 8 of the socket 2. At the same time, the conical upper end 9' of the electrode part 3 presses into the lower conical cavity 9 of said socket. This pressure causes the said socket to expand and tighten against the inner wall of the hole 14 providing perfect electrical contact.

This invention is an improvement on the electrode invention shown in the U.S. Pat. No. 3,521,026 issued on July 21st, 1970 to the same inventor. The improvement lies in the three sectional electrode where the expanding of the central flexible section and the consequent tightening of the electrode against the block in which it is contained, is caused by the sliding action upon a conical surface rather than on an inclined plane.

Having described the invention, what I claim is:-

1. "An electrode for multiple spot welding in electrical resistance welding comprising an electrode made of an electrically conductive metal rod of circular cross-section which is divided into three separate sections which fit into each other on matching conical surfaces; the upper section being in the form of a solid plug having a flat upper surface and terminating into a cone shaped bottom; a central or middle section consisting of a round rod of the same diameter as said plug, having a central hole therethrough, a plurality of equa-lly spaced vertical cavities in its wall which terminate a short distance before said central hole, and one of said vertical cavities running from the wall to and connecting with said central hole, an upper conical cavity into which fits the conical bottom of said plug, and a lower conical cavity into which fits the upper end cone of the bottom electrode part; a bottom or main body electrode part consisting of a cone shaped upper end; a welding tipped lower end, a cooling water chamber with intake and outlet passages therein and an externally located washer acting in conjunction with cuts in the wall of this electrode part for the purpose of limiting the up and down travel of the electrode to a predetermined distance; and said middle section plug being capable of expanding in diameter in order to provide a tight electrical contact, when pressure is applied to it by the upper plug.

2. Electrodes such as described in claim 1 in combination with a block of electrically conductive metal provided with tubular cavities in which said electrodes are contained, each cavity having at the top thereof a hollow rubber cushion; a manifold on top of said block having a main passage way which is directly connected to each of said tubular cavities, said passage containing grease which is fed into said rubber cushions; and a cooling water passage located within said block and connected with the cooling water chambers in each of the electrodes.

* * * * *